US009329091B2

(12) United States Patent
Cochran et al.

(10) Patent No.: US 9,329,091 B2
(45) Date of Patent: May 3, 2016

(54) SHAPED TARGET ABSORPTION AND DISPERSION MODELING

(75) Inventors: Don W. Cochran, Gates Mills, OH (US); Benjamin D. Johnson, Lyndhurst, OH (US); Denwood F. Ross, III, Austinburg, OH (US)

(73) Assignee: Pressco IP LLC, Cleveland, OH (US)

( * ) Notice: Subject to any disclaimer, the term of this patent is extended or adjusted under 35 U.S.C. 154(b) by 1131 days.

(21) Appl. No.: 12/852,311

(22) Filed: Aug. 6, 2010

(65) Prior Publication Data

US 2011/0044670 A1  Feb. 24, 2011

Related U.S. Application Data

(60) Provisional application No. 61/231,944, filed on Aug. 6, 2009.

(51) Int. Cl.
A45D 20/40 (2006.01)
G01K 7/42 (2006.01)

(52) U.S. Cl.
CPC .............. *G01K 7/42* (2013.01); *G01K 2213/00* (2013.01)

(58) Field of Classification Search
CPC .............................. G01K 7/42; G01K 2213/00
USPC ................................ 392/301, 407, 416; 703/2
See application file for complete search history.

(56) References Cited

U.S. PATENT DOCUMENTS 6,615,061 B1 9/2003 Khalil
7,425,296 B2 9/2008 Cochran et al.
2006/0092422 A1 5/2006 Mottin
2006/0280825 A1 12/2006 Cochran et al.
2007/0006651 A1 1/2007 Kruger et al.
2007/0073118 A1 3/2007 Ridder et al.
2007/0096352 A1 5/2007 Cochran et al.
2009/0102083 A1 4/2009 Cochran et al.
2011/0002677 A1 1/2011 Cochran et al.
2011/0006462 A1 1/2011 Cochran et al.

FOREIGN PATENT DOCUMENTS

WO    WO 2008/121871 A2    10/2008

OTHER PUBLICATIONS

Williams, Matt; Absorption of Light; Jul. 2011; University Today; http://www.universetoday.com/87943/absorption-of-light/.*
International Search Report for PCT/US2010/044768 dated Nov. 15, 2010.

(Continued)

*Primary Examiner* — Dana Ross
*Assistant Examiner* — Joseph Iskra
(74) *Attorney, Agent, or Firm* — Fay Sharpe LLP

(57) ABSTRACT

A technique is provided to model a heat penetration profile for various targets which are non-planar or three-dimensionally shaped targets for use in a heating system. The relative volume of material that is irradiated at various depths may have an impact on the absorbed heat profile through the target. For example, a hollow cylindrical product has substantially more material per micro-meter near the outside diameter than it does near the inside diameter. Accordingly, the thickness of the wall or the diameter of the hollow inside the cylinder, as well as the outer diameter of the cylinder, have a substantial impact on the ultimate heat profile through the wall.

22 Claims, 4 Drawing Sheets

(56) References Cited

OTHER PUBLICATIONS

Scott A. Prahl et al., "Determining the optical properties of turbid media by using the adding-doubling method," Applied Optics, vol. 32, No. 4, pp. 559-568, Feb. 1, 1993.

Steven L Jacques et al., "Modeling Optical and Thermal Distributions in Tissue During Laser Irradiation," Lasers in Surgery and Medicine 6:494-503, pp. 494-503, 1987.

* cited by examiner

SHAPED TARGET ABSORPTION AND DISPERSION MODELING

This application is based on and claims priority to U.S. Provisional Application No. 61/231,944, filed Aug. 6, 2009, which is incorporated herein by reference in its entirety.

BACKGROUND

The present invention involves a modeling and calculation technique which is valuable for properly practicing Digital Heat Injection technology. Digital Heat Injection (DHI) technology is a technology that is detailed and described extensively in a series of patents and patent applications including U.S. Pat. No. 7,425,296; U.S. application Ser. No. 11/351,030 (filed Feb. 9, 2006 as a continuation of U.S. Pat. No. 7,425,296); U.S. application Ser. No. 11/448,630 (filed Jun. 6, 2006); U.S. application Ser. No. 12/135,739 (filed Jun. 9, 2008); U.S. Provisional Application No. 61/224,822 (filed Jul. 10, 2009); and, U.S. Provisional Application No. 61/157,799 (filed Mar. 5, 2009), all of which are incorporated herein by reference in their entirety.

DHI technology can be summarized as an efficient technique for heating, drying, curing, cooking, and many other processes by taking advantage of the characteristic absorption signature of the target item and correspondingly irradiating the target item with narrow-band irradiation at wavelengths or narrow wavelength bands which are selected in accordance with the absorption signature or characteristics of the target.

For example, if a particular target material has a desired absorption level at 1450 nano-meters, then a system can be designed to irradiate the target at that wavelength to take advantage of that particular absorption coefficient which directly affects the heat penetration curve as a function of the depth from the front irradiation surface. This curve is often referred to herein as the heat profile. As one trying to practice the DHI art will very quickly begin to understand, in order to get optimum results from the DHI application, it is desirable to do many calculations and extensive modeling ahead of time in order to achieve a satisfactory result.

There is a multitude of parameters that need to be considered and evaluated to do thorough modeling of the result. Many of these fundamental parameters are described in the patents listed above. Certainly, the fundamentals of absorption coefficients and thickness of material and methodologies for narrow band irradiation are covered very thoroughly in the DHI patent(s) and applications referenced above. What is not taught is a specific technique for modeling some of the circumstances that one practicing DHI technology may run into in various applications.

BRIEF DESCRIPTION

In one aspect of the presently described embodiments, the method comprises inputting material parameters of the targets, physical geometry of the targets and at least one wavelength for emission by the narrowband irradiation devices, determining if the material parameters define a material that scatters energy, if the material scatters energy, determining if the input wavelength is correct based on an absorption coefficient of the material, a scattering coefficient of the material, and anisotropy, if the material is not a scattering material, determining if the wavelength is correct based on an absorption coefficient, repeating the inputting and determining if the wavelength is not correct, and, implementing the correct wavelength in the heating process for the targets if the wavelength is correct.

In another aspect of the presently described embodiments, if scattering material is determined, determining if the wavelength is correct further comprises performing a Monte Carlo simulation.

In another aspect of the presently described embodiments, the method further comprises determining an energy deposition profile.

In another aspect of the presently described embodiments, if a non-scattering material is determined, the determining of the correct wavelength further comprises calculations based on the Beer-Lambert law.

In another aspect of the presently described embodiments, the method further comprises determining an energy deposition profile.

In another aspect of the presently described embodiments, the method further comprises evaluating boundary conditions.

In another aspect of the presently described embodiments, the method further comprises calculating multi-dimensional incremental irradiation parameters.

In another aspect of the presently described embodiments, the method further comprises determining a temperature profile.

In another aspect of the presently described embodiments, the system comprises a processing module operative to receive material parameters of the targets, physical geometry of the targets and at least one wavelength for emission by the narrowband irradiation devices, determine if the material parameters define a material that scatters energy, if the material scatters energy, determine if the input wavelength is correct based on an absorption coefficient of the material, a scattering coefficient of the material, and anisotropy, if the material is not a scattering material, determine if the wavelength is correct based on an absorption coefficient, and repeating the inputting and determining if the wavelength is not correct, and, a heating system operative to implement the correct wavelength in a heating process for the targets if the wavelength is correct.

In another aspect of the presently described embodiments, if scattering material is determined, the processing module is operative to determine if the wavelength is correct further by performing a Monte Carlo simulation.

In another aspect of the presently described embodiments, the processing module is operative to determine an energy deposition profile.

In another aspect of the presently described embodiments, if a non-scattering material is determined, the processing module is operative to determine of the correct wavelength by performing calculations based on the Beer-Lambert law.

In another aspect of the presently described embodiments, the processing module is operative to determine an energy deposition profile.

In another aspect of the presently described embodiments, the processing module is operative to evaluate boundary conditions.

In another aspect of the presently described embodiments, the processing module is operative to calculate multi-dimensional incremental irradiation parameters.

In another aspect of the presently described embodiments, the processing module is operative to determine a temperature profile.

In another aspect of the presently described embodiments, the heating system comprises arrays of the narrowband irradiation devices emitting energy in narrow wavelength bands matching absorptive characteristics of the targets.

In another aspect of the presently described embodiments, the system further comprises a feedback module.

DETAILED DESCRIPTION

The present invention teaches, among other things, a novel concept of how to model the heat penetration profile for various targets which are non-planar or three-dimensionally shaped targets. The targets may include a variety of items such as PET or plastic preforms, various containers, bottles, food items, etc. This can be significant because the relative volume of material that is being irradiated at various depths may have a great deal of affect on the absorbed heat profile through the target product. For example, a hollow cylindrical product has substantially more material per micro-meter near the outside diameter than it does near the inside diameter. The thickness of the wall or the diameter of the hollow inside the cylinder as well as the OD or outer diameter of the cylinder have a substantial affect on the ultimate heat profile through the wall. The effect is so significant that an entirely different wavelength may likely be chosen to irradiate if this information is modeled into the calculations.

Figure 1:
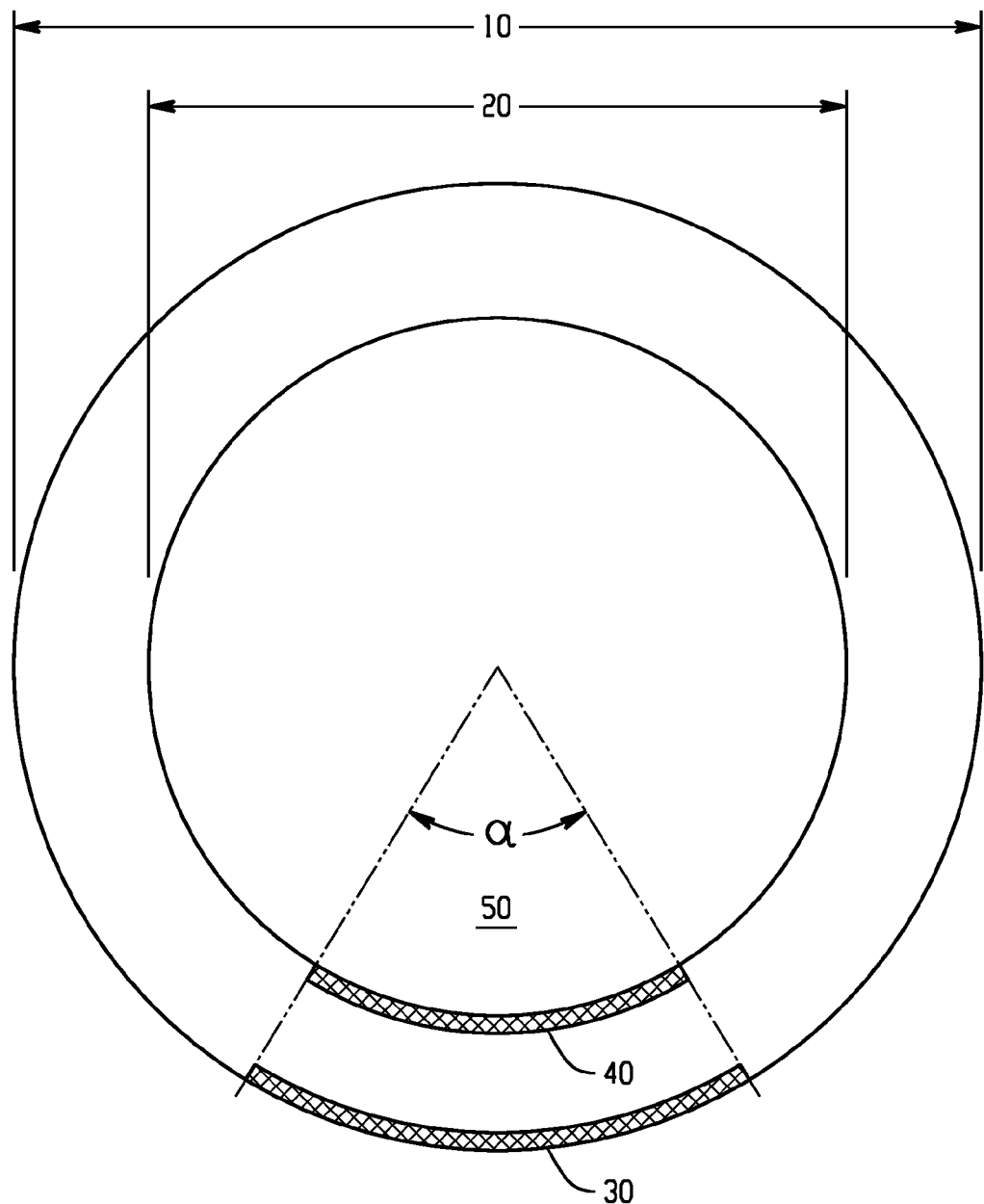
FIG. 1 illustrates concepts considered in accordance with the presently described embodiments.

By way of specific example, as illustrated in FIG. 1, an 18 mm diameter (10) hollow cylindrical component (50) which has a 15 mm inside diameter (20) and therefore a 1.5 mm wall thickness, yields an interesting calculation. There is approximately 36% more material for the same arc segment (30) at the outside diameter versus the inside diameter arc segment (40). In other words, a thin slice of material from the OD would contain approximately 36% more cubic millimeters of material than the same thickness thin slice from the inside diameter of the product. This, of course, means that there is more material to absorb the radiant energy on the OD than there is in the inside of the product. This physical reality yields a very different heat profile than would be obtained from calculating the heat profile of a 1.5 mm thick flat tile of the same material. This is an important thing to be able to model for processing PET preforms, as an example, because it may be one reason that the material can be warmer at the inside surface than at the outside surface—which is a very desirable condition for blowing PET bottles. The considerations and calculations taught herein may well, for example, yield a different recommended wavelength for reheating preforms than all methodologies which have been taught heretofore.

Another important aspect of this invention is teaching the importance and methodologies for properly calculating and modeling the effect of different non-planar 3-D shapes. The above example of a cylindrical shape is a target which varies in two dimensions when compared to a planar target. Other targets may vary in three dimensions such as substantially spherical shapes like a ball or a kernel of popcorn. Targets which vary in two dimensions may more nearly be modeled as one that varies in three dimensions from a planar target, if the non-varying dimension is similar or smaller than the varying dimensions. For example, a very short cylindrical target may act more like a target which varies from a planar surface in three dimensions, depending on what the irradiation pattern is like for that application.

Another novel feature and teaching of this patent relates to the modeling and prediction of the affects of scattering in a material when heated with a narrowband DHI technique. While absorption coefficients have been well documented in a number of fields, the scattering or dispersion effect inside a material is very poorly documented.

Figure 2:
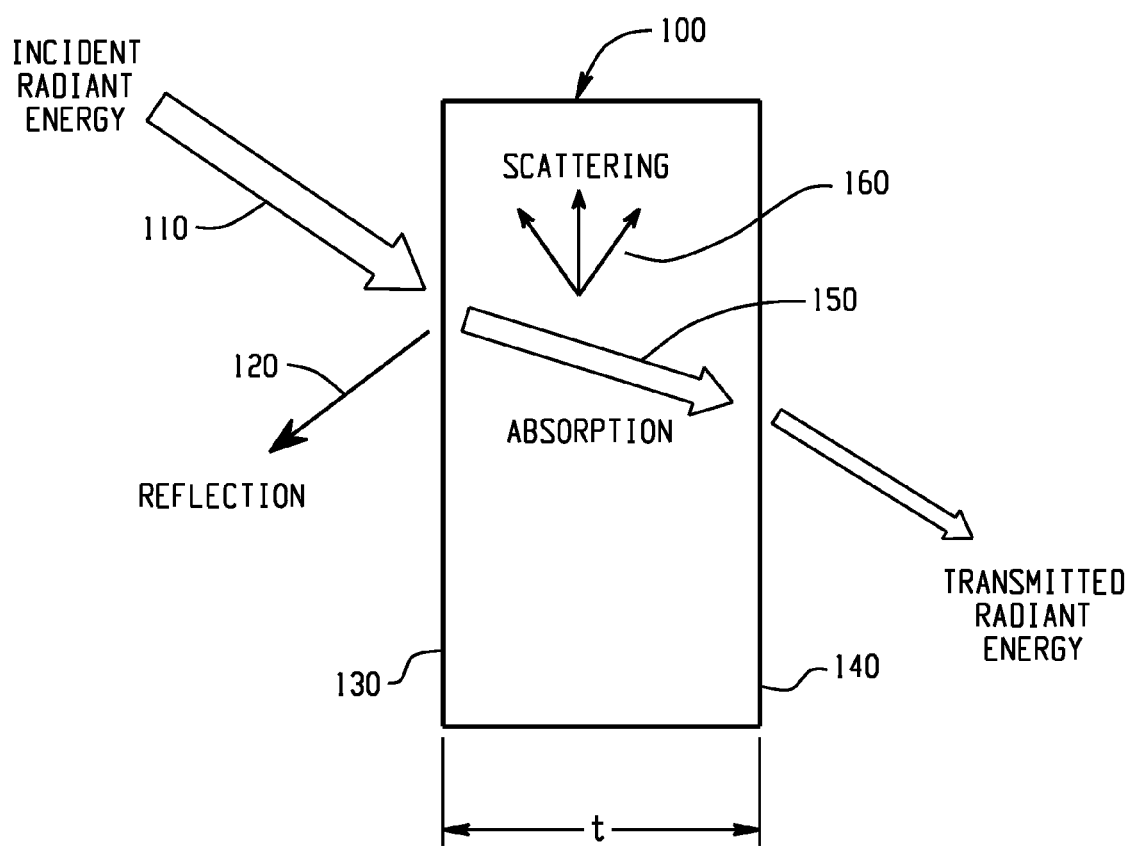
FIG. 2 illustrates concepts considered in accordance with the presently described embodiments.

As is shown in FIG. 2, when irradiating a material 100, there are predominantly three phenomena which occur with respect to incident energy 110. One is reflection of energy (shown at 120), which primarily occurs at the front surface 130 of the material -but with a reduced amount of internal reflection at the rear surface 140 of the material because of the change in the index of refraction from its surroundings. Absorption, the second phenomena, occurs inside the material (as shown at 150) in an exponential way according to Beer's Law and the absorption coefficient of the material. The third phenomenon occurs in non-optically clear materials is scattering or dispersion (as shown at 160). Scattering is actually a combination of bending around the molecules which make up a material or inelastic bouncing off some of the molecules in such a way that the energy diverts substantially from its straight line path. Scattering, like absorption, has its own energy deposition curve which defines its behavior as a function of irradiation wavelength. Until the experimental work which resulted in this advancement, very little was known or documented about the way scattering affects energy deposition and/or thermal profile. The flow chart detailed in FIG. 3 documents an example technique according to this invention to model the effect of scattering in various materials whose scattering coefficient has been documented.

Another feature of the present invention is the ability to predict and model the interplay between the absorption coefficient and scattering coefficient to predict the net energy deposition and/or heat profile that will result from narrowband DHI irradiation. It has been discovered that, while the absorption curve alone provides adequate information for predicting the energy deposition inside many products, it is not adequate to predict the energy deposition nor the optimal wavelength to be used when a non-negligible scattering coefficient is present in a material.

Yet another closely related advantage of the current invention is the ability to determine the optimal narrowband wavelength which should be used to irradiate a particular type of material to yield the most desired heat deposition profile. By overlaying, or combining, the absorption coefficient curve, or data, with the scattering coefficient curve, or data, it is possible to determine an energy deposition curve (or function) that is a composite of the two. By using that information in combination with the flow chart technique indicated in FIG. 3, it is possible to determine the optimal wavelength that should be recommended for a particular DHI narrowband application.

Yet another feature of the present invention is the ability to use the composite energy deposition curve (or function) described above to determine a secondary and/or tertiary wavelength which may be used in conjunction with a particular application to amplify a particular effect. For example, a particular wavelength may be determined to be optimal for browning the surface of a baked product while another wavelength might be optimal for the best deep cooking penetration. The present invention's modeling may well yield a substantially different result with many target materials than would be anticipated by simply using the absorption coefficient information.

Yet another advantage of the present invention is the ability to use this modeling technique to further optimize the DHI narrowband irradiation source. The angle, direction, wavelength, intensity, and irradiation time or pulse-width and/or duration that might be optimum for a particular energy deposition profile through a given material can be optimized to a much higher level than by using absorption coefficients alone. For example, it is possible to determine very precisely how much energy will exit through the backside of a target product thereby allowing an optimization of the characteristics of a reflector surface which might return that energy back into the product if desirable to improve the heat deposition profile.

These concepts can be used by one skilled in the art to model and design much more effective narrowband irradiation applications of many different types and configurations. The examples given are simply to illustrate concepts and not to limit the ways in which the concepts can be applied to the many different narrowband irradiation applications to which they would be relevant.

Matter can act on electromagnetic radiation in a variety of ways. As noted above, FIG. 2 shows a typical situation where an incident light beam passes through a slice of matter with arbitrary thickness. The primary effects which will interfere with the passage of radiant energy through the material are: reflection, absorption and scattering.

The impact that each of these effects has on the intensity of the transmitted radiant energy varies based on properties of both the electromagnetic energy and the material. For all non-optically clear media, the balance between scattering and absorption is key to determining the energy profile.

In addition, it has been determined by way of the model and verified experimentally that the position and orientation of the irradiation source and the shape of the material to be heated are both critical factors in determining the actual temperature profile after irradiation.

The simplest case involves light directly incident on a flat panel of material. This type of interaction is well described in existing literature (Beer-Lambert Law). A sample of PET undergoing this interaction would acquire a temperature profile across the thickness of the material that falls off from the initial surface following the exponential decay of the incident energy. Depending on the incident wavelength, this gradient between the external and the internal surface can be quite pronounced especially for wavelengths at which the material exhibits a higher absorption coefficient.

In the more complicated case, the energy is incident perpendicular to the curved surface of a cylindrical part. This can be accomplished by rotating either the cylindrical sample or spinning the source in orbit around it. Surprisingly, this irradiation/shape combination yields a "reverse" temperature gradient, where the inner surface rises more quickly than the outer surface. Due to the novel way the narrowband DHI sources provide energy, this type of profile is not well documented or understood before the experimental work and modeling which lead to this invention.

Detailed understanding of the interactions of the emitter/ energy/material/geometry system provides multiple opportunities to optimize one or more of the parameters for a given application. The mathematical model represented by this invention will quantify the interactions and facilitate the correct choice of wavelength, material characteristics, and geometry to optimize heating results and fully understand the energy deposition profile.

Figure 3:
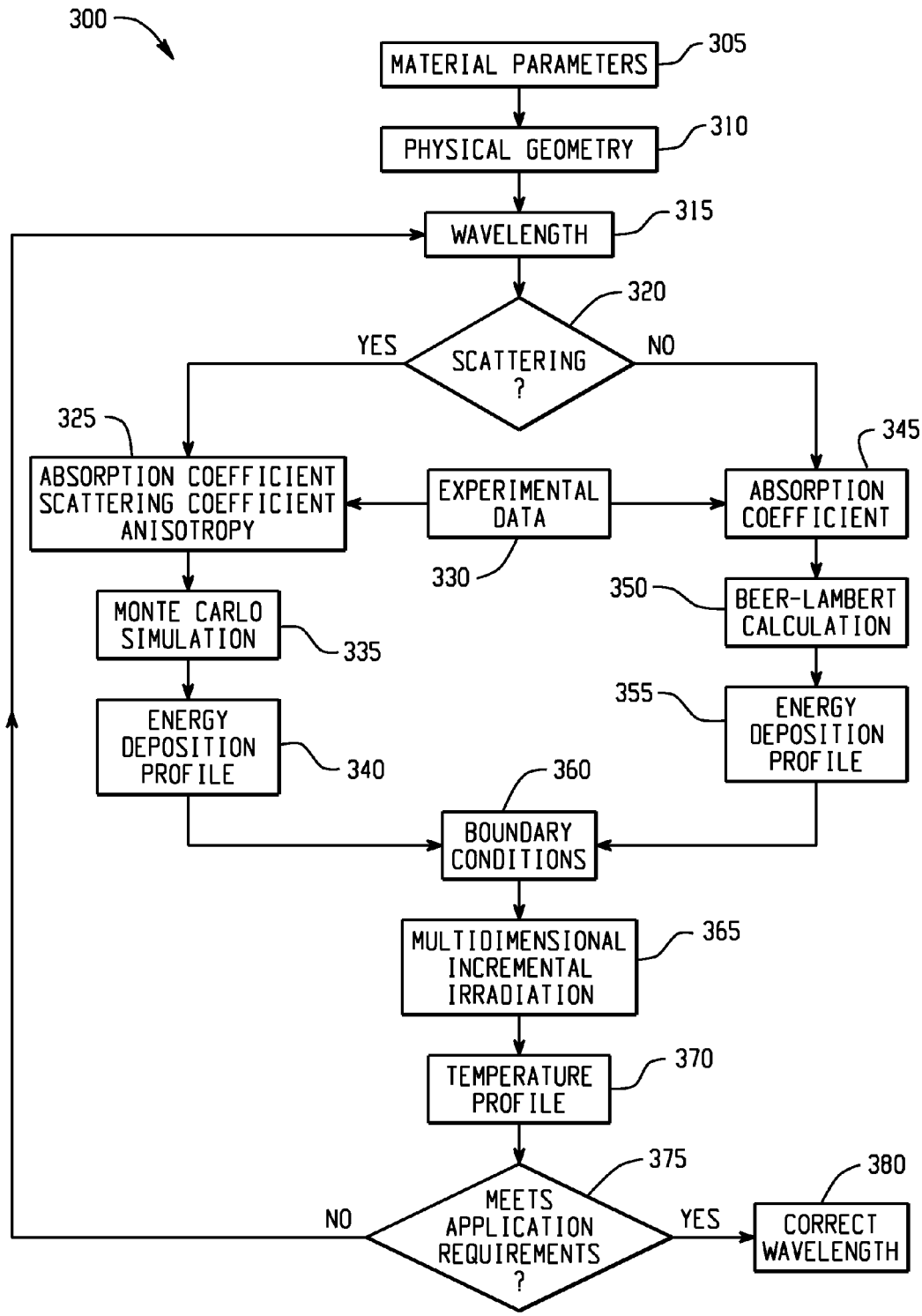
FIG. 3 is a flow chart illustrating a method according to the presently described embodiments; and, FIG. 4 illustrates an exemplary system according to the presently described embodiments.

An example flow diagram for a routine for a modeling procedure according to the presently described embodiments is represented in FIG. 3. It should be appreciated that the described method may be implemented in a variety of environments using various software techniques and/or suitable hardware configurations. The method may be implemented to heat a variety of different targets including preforms (such as plastic PET preforms), food items, containers, bottles, etc. in corresponding systems, such as ovens used in connection with bottle forming systems or ovens used to heat food items.

As shown, a method 300 is able to account for a variety of material properties, geometries and wavelengths based on the requirements of the individual application under consideration. This modeling has proven valuable in the area of preform reheating and has opened the door to further advances in preform design and preform geometrical relationships. Similar optimization advantages can be gained in many other fields in which DHI heating technology will be implemented, especially those which involve non-planar shaped targets or targets which have substantial scattering properties in the target material.

In the illustrated form, the method 300 is initiated and accepts input of various parameters such as material properties, physical geometry and wavelength. In this regard, in the example method shown, Material Properties, gathered either through literature or experimentation, are required for accurate modeling and input (at 305). In particular, material properties such as the density, specific heat, refractive index, and thermal conductivity are necessary in this example to properly model the distribution and flow of energy deposition during and after irradiation.

Similarly, in this example, proper measurements of the physical three-dimensional geometry of the part or section to be modeled known a priori and input (at 310). Depending on the shape of the object, height, length, width, radius, thickness, or other relevant measures must be provided (with the correct units) in order to set up the model.

By choosing the physical geometry, the energy deposition which results in the final temperature profile can be predicted so that a product design can be optimized. The model shown in FIG. 3 can be used to consider the physical characteristics just as it can be used to determine an ideal wavelength for a desired result. The very fact that there is more volume of material as a function of distance from the entrance point of the irradiation energy (e.g. see FIG. 1) must be considered as an integral piece of the model. For example, by changing the geometry of a PET preform which would be outside diameter, inside diameter, and wall thickness, an oven reheating system may be better optimized. The wavelength can be incrementally changed and then re-modeled to yield further optimization of a desired overall set of parameters.

In this version of the algorithm, it is necessary to select and input a single Wavelength to be modeled as it interacts with the material (at 315). Where it is desirable to use multiple wavelengths because of the specific energy deposition result imparted by each, they must be modeled separately and the results combined for a composite. This choice follows the prior art on DHI, using the wavelength estimated to be the most efficient, cost effective and/or appropriate to the final desired temperature or result.

Next, a determination is made as to whether the material being evaluated has significant scattering properties that should be considered (at 320). This, of course, is based on the material that is used, the input material parameters and the wavelength (such as the input wavelength). This can be accomplished in a variety of manners, but in one form the scattering properties can be compared to a threshold or limit to determine if they are significant enough to warrant consideration in the subsequent evaluation.

As is well known in literature, some turbid materials scatter the light as it passes through the material. It is very important to understand that this is a distinctly different attenuation mechanism than absorption and must be accounted for as such in the calculations. For that reason, a measure has been created which is a "scattering coefficient". It has been derived and verified experimentally. Inhomogeneities in the material result in multiple interactions with photons as they pass through the material that can alter the direction, intensity and phase of the light. Depending on the difference between the particle size of the scatterer and the wavelength of the light, the direction of scatter can be biased forward in the original direction of travel, backwards with respect to the incident light, or in some distribution about the scattering particle. Experimental or literature values or functions of the anisotropy can be used to generally express the probability of a given direction of scatter.

In the scattering case (e.g. where it is determined that the subject material has sufficient scattering properties to warrant consideration in the analysis), Absorption Coefficient, Scattering Coefficient and Anisotropy must either be known or calculated (at 325) from Experimental Data (shown, if needed, at 330) prior to modeling. The two coefficients describe the likelihood of the light to either be absorbed or to scatter upon its interaction with the matter while the anisotropy value or function determines the preference of the light to favor either forward or backward scattering.

In order to account for both absorption and scattering interactions in the modeling, it is suggested that a statistical simulation, such as a Monte Carlo statistical simulation, be used (at 335) with a large number of simulated photons to provide an Energy Deposition or Distribution Profile within the material (at 340). Although it is also reasonable to employ any appropriate statistical methodology to calculate the deposition of energy using the optical properties defined above, the Monte Carlo simulation uses the absorption and scattering coefficients to determine the amount of energy that could potentially be absorbed or scattered when a given, random photon interacts with the material. The anisotropy value can then be used to provide a vector for scattered photons based on the probability of going in a particular direction (with 1 as forward, 0 as uniform about the scattering particle and −1 as backwards). By simulating on the order of millions of photons, a statistically accurate distribution of energy can be created.

Other materials, being homogeneous or optically clear, provide only negligible scattering potential. In this case, a different set of calculations can be used to save time and computational resources in the presently described embodiments while still providing useful results about the eventual temperature profile after irradiation. In the non-scattering case, wherein the material is optically transparent at the wavelength which is being used for the DHI irradiation, the absorption mechanism completely drives the attenuation of incident light and only the Absorption Coefficient is required (at 345) to calculate the energy deposition. This type of interaction is well understood and can be expressed by the Beer-Lambert Law (at 350).

$$I(z) = I_0 \exp(-\alpha z)$$

where $I(z)$ is light intensity at a distance z into the material, $I_0$ is light intensity entering material, and $\alpha$ is a material absorption coefficient.

By rewriting the equation in terms of energy (E), an expression as a function of position within the material can be developed.

$$\frac{I(z)}{I_0} = \frac{\frac{1}{2}\varepsilon_0 c E(z)^2}{\frac{1}{2}\varepsilon_0 c E_0^2} = \exp(-\alpha z)$$

$$E(z) = E_0 \exp\left(\frac{-\alpha z}{2}\right)$$

where $\varepsilon_0 c$ are values (such as vacuum permittivity and the speed of light), which cancel out the equation above.

This provides the Energy Deposition or Distribution Profile (at 335) for the non-scattering case.

In both the scattering and non-scattering cases, the optical property data was gathered using, for example, Experimental Data (at 330) from a standard near infra-red spectrometer. There are a number of additional experiments or apparatus that could be used to determine these values with varying degrees of accuracy. Similar experiments would be directly applicable in both longer and shorter wavelengths if such wavelengths are to be used for DHI irradiation of the target sample.

With an understanding of how the incident energy is distributed within the material, the Boundary Conditions at the edges of the material must be considered (at 360) before active modeling can occur. Some of the Physical Parameter must be carried into the boundary, be it a container, the surrounding atmosphere or a combination of different boundaries. In addition, similar Material Parameters to those known about the material must also be determined to properly model the flow of energy out of the material.

Multidimensional Incremental Irradiation, developed specifically for this application, is a method by which the temperature change due to the irradiation of the material, which also considers the loss at, or impact of, the boundaries, can be simulated over time and within the bulk of the object (at 365). First, both the spatial and temporal dimensions of the system are quantized to provide discrete "bins" in which energy can be deposited, or lost or gained from neighbors. These bins have both a time and a position component. As the time component is incremented forward, the initial energy distribution calculated previously is applied to the material and the temperature change is calculated. Energy flow within, and out of, the material is also calculated at each increment. After the defined irradiation time has elapsed, the internal and external energy flows are continually monitored until the observation time is reached. It is also possible to observe the temperature profile before the irradiation time has been reached or at the moment irradiation stops. The Temperature Profile that is produced at the end of the observation time (at 370) provides a plot of the temperature through the bulk of the material as well as the incident and exit surfaces.

This data can be compared to the requirements for the application to determine the utility of the incident wavelength (at 375). Should the tested wavelength prove to be incompatible with the material, geometry or application (i.e. too hot on one surface, insufficient temperature change at some position, etc.), another wavelength can be chosen and the model can be re-run with the new value. If the tested wavelength is determined (at 375) to be a correct wavelength (at 380), then the correct wavelength may be used in a variety of manners, including as input to a system for heating plastic preforms or other objects (such as food items, as a further example).

Also, it should be appreciated that the presently described embodiments could be used to determine other parameters, in addition to correct wavelength. For example, if the wavelength and material properties are known, it would be possible to determine a physical geometry to yield a desired temperature profile. Accordingly, various such combinations may be used in different circumstances. The method 300 is merely an example.

In this regard, it will be appreciated that the techniques described and contemplated herein may be suitably applied to DHI systems, and may take a variety of forms. For example, these techniques may be implemented using a variety of different hardware configurations and/or software techniques to realize the beneficial results of the invention. Suitable processors, software routines, controllers, etc. may be implemented to achieve the presently described embodiments in suitable environments.

Figure 4:
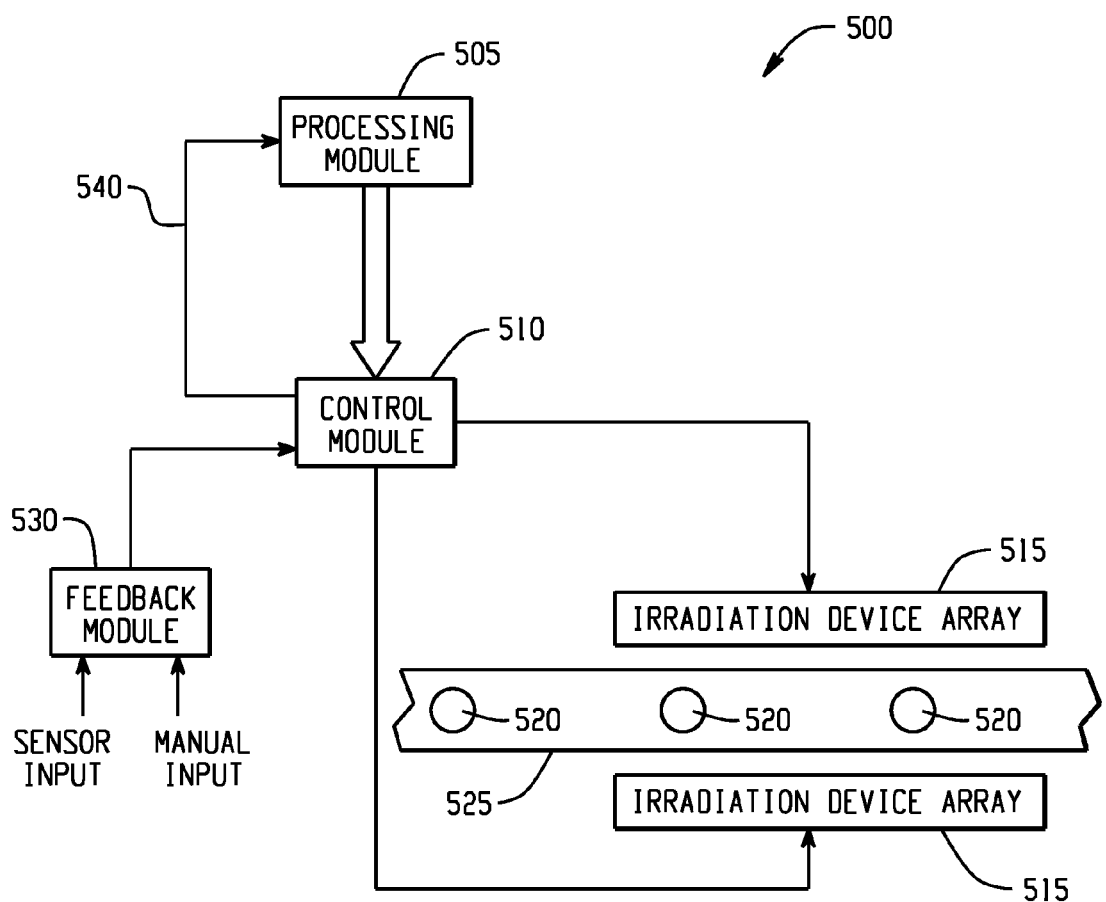

In this regard, with reference to FIG. 4, an example system 500 is shown. System 500 includes a processing module 505. It is to be appreciated the processing module 505 is operative to, in one form, store the appropriate data and execute any necessary routines to perform the method 300 of FIG. 3. Of course, it should be appreciated, that this is merely one form of the presently described embodiments. Other configurations for realizing the method and system described herein may be implemented.

The system 500 also includes a control module 510 which is operatively connected to, in one form, arrays 515 of narrowband irradiation devices that are implemented to heat items, such as preforms 520, that are conveyed or placed into a zone between the arrays 515 by a suitable transport system, such as a conveyor 525, or by other techniques such as manual or automated placement. The system also includes an optional feedback module 530 which is operative to provide feedback to the control module 510. This feedback may be provided by sensors (not shown) that are suitably positioned within the system to monitor conditions such as temperature, etc., or otherwise gathered information on material parameters or geometry. Feedback may likewise be input to the system from other sources such as through manual input by system operators. It should be appreciated that another optional feature of the system is that the control module may provide a modification of parameters to the processing module 505 to re-execute the method 300 to recalculate parameters such as wavelength (shown at 540). This function of the control module in requesting recalculation may be based on the feedback parameters from module 530, on a periodic basis, or at the request of a system operator.

It should further be appreciated that the system 500 includes the processing module 505 to execute the method 300—which is designed to provide narrowband irradiation to targets, such as preforms (such as PET preforms) 520, to properly heat the target using narrowbands of energy that match desired absorption characteristics of the targets (e.g. the preforms). As noted, this is merely an example of an implementation of the presently described embodiments. The system 500 or other heating systems for heating targets may be used as cooking ovens used for, as an example, heating or cooking food items—such systems include DHI ovens used to heat or cook food items using narrowband irradiation devices emitting energy in selected or desired narrow wavelength bands matching desired absorption characteristics of the food items or portions thereof.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for modeling a heating process for non-planar or three-dimensionally shaped targets using narrowband irradiation devices, the method comprising:
   inputting material parameters of a non-planar or three-dimensionally shaped target, physical geometry of the target and at least one wavelength for emission by the narrowband irradiation devices;
   determining if the material parameters define a material that scatters energy;
   if the material scatters energy, determining if the input wavelength is correct based on an absorption coefficient of the material, a scattering coefficient of the material, and anisotropy;
   if the material is not a scattering material, determining if the wavelength is correct based on an absorption coefficient;
   repeating the inputting and determining if the wavelength is not correct; and,
   implementing the correct wavelength in the heating process for the target, if the wavelength is correct, to heat the target wherein the correct wavelength matches desired absorption characteristics of the target.

2. The method as set forth in claim 1 wherein, if the material scatters energy, determining if the wavelength is correct further comprises performing a Monte Carlo simulation.

3. The method as set forth in claim 2 further comprising determining an energy deposition profile.

4. The method as set forth in claim 1 wherein, if a non-scattering material is determined, the determining of the correct wavelength further comprises calculations based on the Beer-Lambert law.

5. The method as set forth in claim 4 further comprising determining an energy deposition profile.

6. The method as set forth in claim 1 further comprising evaluating boundary conditions.

7. The method as set forth in claim 1 further comprising calculating multi-dimensional incremental irradiation parameters.

8. The method as set forth in claim 1 further comprising determining a temperature profile.

9. A system for heating non-planar or three-dimensionally shaped targets using narrowband irradiation devices, the system comprising:
   a processing module operative to receive material parameters of a non-planar or three-dimensionally shaped targets, physical geometry of the targets and at least one wavelength for emission by the narrowband irradiation devices, determine if the material parameters define a material that scatters energy, if the material scatters energy, determine if the input wavelength is correct based on an absorption coefficient of the material, a scattering coefficient of the material, and anisotropy, if the material is not a scattering material, determine if the wavelength is correct based on an absorption coefficient, and repeating the inputting and determining if the wavelength is not correct; and,
   a heating system operative to implement the correct wavelength in a heating process for the targets, if the wavelength is correct, to heat the target wherein the correct wavelength matches desired absorption characteristics of the target.

10. The system as set forth in claim 9 wherein, if the material scatters energy, the processing module is operative to determine if the wavelength is correct further by performing a Monte Carlo simulation.

11. The system as set forth in claim 10 wherein the processing module is operative to determine an energy deposition profile.

12. The system as set forth in claim 9 wherein, if a non-scattering material is determined, the processing module is operative to determine of the correct wavelength by performing calculations based on the Beer-Lambert law.

13. The system as set forth in claim 12 wherein the processing module is operative to determine an energy deposition profile.

14. The system as set forth in claim 9 wherein the processing module is operative to evaluate boundary conditions.

15. The system as set forth in claim 9 wherein the processing module is operative to calculate multi-dimensional incremental irradiation parameters.

16. The system as set forth in claim 9 wherein the processing module is operative to determine a temperature profile.

17. The system as set forth in claim 9 wherein the heating system comprises arrays of the narrowband irradiation devices emitting energy in narrow wavelength bands matching absorptive characteristics of the targets.

18. The system as set forth in claim 9 further comprising a feedback module.

19. The method as set forth in claim 1 wherein the heating process is a cooking process.

20. The method as set forth in claim 1 wherein the target comprises plastic or a food item.

21. The system as set forth in claim 9 wherein the heating system comprises an oven.

22. The system as set forth in claim 9 wherein the target comprises plastic or a food item.

* * * * *